Oct. 31, 1950   P. L. SPENCER   2,528,251
RECEPTACLE
Filed March 8, 1947
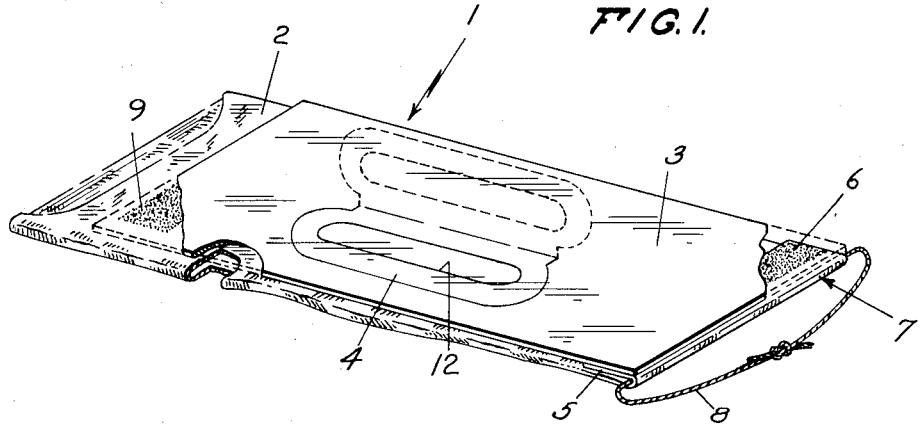
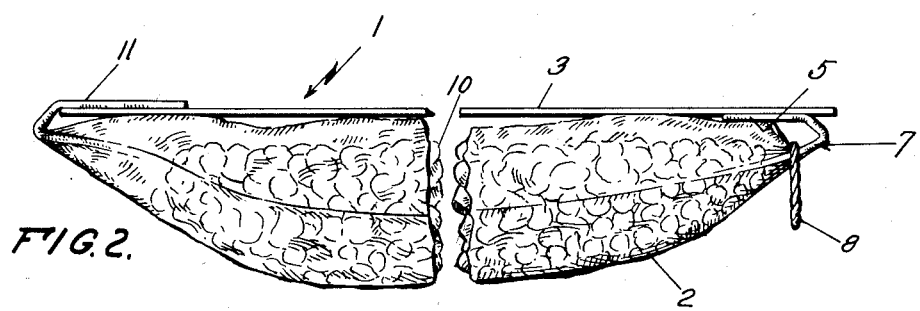
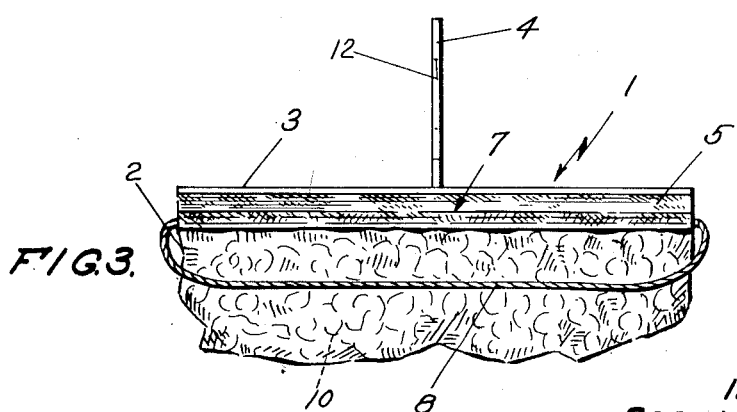
INVENTOR
PERCY L. SPENCER
BY Elmer J. Gorn
ATTY.

Patented Oct. 31, 1950

2,528,251

UNITED STATES PATENT OFFICE 2,528,251

RECEPTACLE

Percy L. Spencer, West Newton, Mass., assignor to Raytheon Manufacturing Company, Newton, Mass., a corporation of Delaware Application March 8, 1947, Serial No. 733,302

1 Claim. (Cl. 229—51)

This invention relates to receptacles, and more particularly to an easily-manipulated protective wrapper for foods which are to be heated or cooked in a microwave heating apparatus.

As disclosed in the copending Welch application, Ser. No. 722,052, filed January 14, 1947, now Patent No. 2,495,435, it is very often desirable to heat or cook bodies of food in a microwave heating device or oven without previously removing the sealed moisture-proof protective wrappers from such bodies, that is, to heat or cook such bodies with the wrappers still on the same.

It has been found that, if the above procedure is carried out, using a conventional receptacle, bag, or even wrapper which is formed of simply a tough flexible sheet material and is sealed at both ends, such material being transparent, for example, certain inconveniences and difficulties are encountered in removing the wrapper when the food has been heated and when it is desired to consume the same. It is desired to remove the food from the oven and to effectuate the removal of the wrapper as soon as possible after the food heating cycle has been completed, so that the food may be served hot. At the end of the microwave heating cycle, the wrapper of such a wrapped body of food is very hot to the touch, although it may be cool as compared to the temperature of the steam, as set forth in the aforesaid application. Therefore it is difficult if not dangerous to grasp said wrapper without some form of protective means. Also, at this time the wrapper is quite soggy or mushy and generally has collapsed on the food, so that it is exceedingly difficult to get a firm grip thereon and to separate the wrapper from the food in order to remove said wrapper. Also, it is necessary, even after the above difficulties have been surmounted, to utilize a separate wrapper cutting or ripping instrument for separating the wrapper from the food; during the time this instrument is being used, the wrapper must be firmly held, and moreover must be held separated from the food, which it is difficult to do, as described above. Even the utilizing of a separate cutting or ripping instrument is inconvenient, if not actually dangerous.

An object of this invention, therefore, is to devise an easily manipulated wrapper or receptacle for foods which are to be heated in a microwave heating apparatus.

Another object is to devise such a food receptacle which will not interfere with the normal storage of such foods.

A further object is to provide a flexible wrapper having attached thereto a rigid backing or supporting member which is not heated appreciably by microwave energy.

A still further object is to devise a tough flexible wrapper having attached thereto a member which is provided with means which renders it easy to get a firm grip thereon.

An additional object is to provide a cooking wrapper for food which is provided with manually-operable opening means, thus rendering it unnecessary to utilize therewith a separate wrapper cutting or ripping instrument.

Still another object is to accomplish the above objects inexpensively yet in an effective manner.

Yet another object is to devise a ripcord means for opening sealed receptacles, which means it is not necessary to seal inside said receptacles, thereby simplifying the design thereof.

The foregoing and other objects of the invention will be best understood from the following description of an exemplification thereof, reference being had to the accompanying drawing, wherein:

Fig. 1 is a perspective view, partly broken away, of a receptacle according to the invention;

Fig. 2 is an elevation of a package of food according to the invention; and

Fig. 3 is an end view of Fig. 2, showing the handle in raised position.

Now referring to Fig. 1, the numeral 1 generally designates a receptacle according to the invention, comprising a flat bag 2 of flexible sheet material and a planar rigid backing or supporting member 3 secured thereto.

Bag 2 is made of a material that has a rather high tensile strength, is somewhat flexible, and is transparent to electromagnetic energy. Suitable materials are available as commercial synthetic plastics. One such material, for example, is produced in the form of transparent cellulose sheets, made by regenerating cellulose from a solution, extruding it into a coagulating bath, then moisture-proofing the same by lacquering on both sides. Another such material is a rubber hydrochloride made in the form of thin transparent sheets. Still another such material is a type of waxed paper which has a high tensile strength.

Flat bags such as 2 are formed from such sheet material by folding the sheet longitudinally to form a lapped longitudinal joint, then sealing the material along such joint. Preferably, the bag 2 may be made two-ply, with the longitudinal seams of each ply displaced laterally from each other. For purposes of simplicity, however, this is not shown in Fig. 1.

Backing member 3 is made of a rather rigid material, which may be, for example, stiff cardboard. In the central region of member 3 an integral handle portion 4 is provided, this handle being made severable from the member 3 along its front and side edges, as by means of score lines, and being pivotally attached to member 3 along its rear edge, as by means of a fold line. Handle 4 is preferably provided with a central aperture 12, to serve as a finger grip. Due to the above construction, handle 4, during storage of the receptacle, lies out of the way in the plane of member 3 but, when desired to be used, said handle may be bent upwardly substantially at right angles to the plane of member 3, as indicated in dotted lines in Fig. 1.

Bags such as 2 are ordinarily produced commercially with one sealed bottom end 5. Pursuant to the inventon, backing member 3 has a width substantially equal to that of bag 2, and a length somewhat less than that of said bag. One end of the bottom face of backing member 3 is secured, as by means of adhesive 6, to one exterior face of bag 2, in a transversely-extending area immediately adjacent the sealed end 5 of the bag. Beyond this secured area, the upper portion of bag 2 is doubled back on itself, toward the length of member 3, along a transverse line spaced from but adjacent to sealed end 5, to provide an external transverse fold 7 in the bag along said line.

A looped ripcord 8, the diameter of the loop being of sufficient size to surround the bag 2, is then passed over the outside of said bag, from the open end thereof, down toward the sealed end thereof, to the final position shown in Fig. 1, in which one side of the loop of said ripcord lies within the fold 7 and the opposite side of the loop lies outside of said bold. Alternatively, ripcord 8 could be slid into position before bag 2 is doubled back on itself, but after the sealed end thereof has been secured to member 3. Ripcord 8 is made of any suitable strong small-diameter cord or string, or it may be made of wire.

The upper portion of bag 2 is doubled back on itself, as above stated, and after ripcord 8 is in position, the exterior face of said bag, which is opposite to that face already secured to member 3, is secured, by means of adhesive 9, to the bottom face of member 3 in an area remote from sealed end 5 of the bag, for example, near the other end of said member as shown. This second securing of bag 2 to member 3 enables member 3 to support the weight of said bag when filled with food and to prevent collapse of the bag when heated, as will be later described, and also serves to maintain fold 7 in the bag and ripcord 8 in position in the fold.

Alternatively, both securings of bag 2 to member 3 could be completed before ripcord 8 were applied to the receptacle, in which case said cord would not be looped, but would be a single length of cord, the cord being threaded through fold 7 and the two ends of said cord being then tied or otherwise secured together to form a loop.

Fig. 1 shows a receptacle itself, without contents, according to the inventon, as an article of manufacture. Now referring to Figs. 2 and 3, which show a rackage of food, frozen food for example, according to the invention, the numeral 10 denotes a body or portion of food, such as an individual portion. In Figs. 2 and 3, elements the same as those of Fig. 1 are denoted by the same reference numerals. Food body 10 is placed inside bag 2, through the open upper end thereof, after which said open upper end is folded over onto the top face of backing member 3 as at 11, said open end being then sealed and fold 11 being also secured to the backing member 3 to provide an additional point of support for said bag by said member. Fig. 3 indicates the bent-up position of handle 4, which is substantially the same as that indicated by dotted lines in Fig. 1.

Figs. 2 and 3, as above stated, illustrate a package of food according to the invention, said package being particularly suitable for heating or cooking in a microwave heating apparatus or oven such as illustrated and described in the copending application of Hall and Gross, Ser. No. 721,540, filed January 11, 1947. When it is desired to heat or cook food 10 in such an oven without first removing the bag 2 therefrom, in accordance with the principles disclosed in the aforesaid Welch application, handle 4 of the food package is bent outwardly and upwardly to the position illustrated in Fig. 3, after which the package of food shown in Figs. 2 and 3 is placed inside a microwave oven (not shown) and radio-frequency energy is applied to said package to heat or cook the food therein. Since bag 2 is made of material which is transparent to electromagnetic energy, the food inside said bag may be readily heated by such energy. The steam produced inside the bag, together with the radio-frequency energy, tends to heat the bag appreciably as compared to body temperature, so that it would tend to become soggy and mushy, and would tend to shrink or collapse around the food when the radio-frequency energy is turned off. However, due to the provision of the rigid backing or supporting member 3, which is secured to bag 2, such collapsing or shrinkage is effectively prevented, and the bag is in effect held to substantially its original shape.

Backing member 3 is made of a material which is not heated appreciably by radio-frequency energy, so that when the body of food has been heated, and the radio-frequency energy turned off, the package of food may be easily grasped and removed from the oven by means of the upstanding handle 4 integral with said member, there being no danger of burns which might result if the hot bag itself were touched; also, said handle makes it very easy to get a firm grip on the package as a whole.

Immediately after the package has been removed from the heating oven, while the food is still hot, and while the package is still being held by handle 4, the ripcord 8 is grasped and is pulled, resulting in tearing or ripping the bag 2 transversely, substantially along the line of fold 7, this tearing being entirely through both thicknesses of material at the fold (or all four thicknesses, if the bag be two-ply), producing an opening in the bag at the fold, through which the food may be easily dispensed while the package is still held by the handle 4. The tearing or ripping of the bag 2 is produced by the cutting therethrough, substantially along the fold line, of the ripcord loop lying within fold 7, in response to the pulling of the opposite ripcord loop in a direction away from the bag. By the provision of this ripcord, no separate bag cutting or ripping instrument need be utilized.

It will be seen, from all of the above, that there has been devised an easily-manipulated food cooking bag, with a ripcord means involving no sealing problems, and one which is easily grasped when heated.

Of course, it is to be understood that this invention is not limited to the particular details as described above, as many equivalents will suggest themselves to those skilled in the art. For example, the rigid backing member, instead of being planar as shown, could be made tubular, entirely surrounding the bag and secured therearound, in order to more effectively hold the bag to shape. Various other variations will suggest themselves. It is accordingly desired that the appended claim be given a broad interpretation commensurate with the scope of this invention within the art.

What is claimed is

A receptacle, comprising a rigid backing member having a handle portion integral therewith, a flat bag of flexible sheet material at least one end of which is sealed, means securing said member to the exterior of said bag adjacent the sealed end thereof, whereby said handle portion is accessible from without said receptacle, said bag being doubled back on itself along a transverse line spaced from but adjacent to said sealed end to provide an external transverse fold in said bag along said line, and manually-operable opening means associated with said fold for tearing said bag substantially along said line.

PERCY L. SPENCER.

REFERENCES CITED

The following references are of record in the file of this patent:

UNITED STATES PATENTS

| Number | Name | Date |
|---|---|---|
| 659,238 | Killinger | Oct. 9, 1900 |
| 1,821,011 | Greenlaw | Sept. 1, 1931 |
| 1,923,452 | Neumiller | Aug. 22, 1933 |
| 2,065,422 | Bolt | Dec. 22, 1936 |
| 2,074,156 | Weber | Mar. 16, 1937 |
| 2,085,365 | Israel | June 29, 1937 |
| 2,347,509 | Salfisberg | Apr. 25, 1944 |
| 2,387,482 | Vineberg | Oct. 23, 1945 |